(12) United States Patent
Doerr

(10) Patent No.: US 7,433,560 B2
(45) Date of Patent: Oct. 7, 2008

(54) RECTANGULAR-PASSBAND MULTIPLEXER

(75) Inventor: Christopher Richard Doerr, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 141 days.

(21) Appl. No.: 11/163,422

(22) Filed: Oct. 18, 2005

(65) Prior Publication Data
US 2007/0086699 A1    Apr. 19, 2007

(51) Int. Cl.
G02B 6/26 (2006.01)
(52) U.S. Cl. .............................. 385/39; 385/31; 385/37
(58) Field of Classification Search .................. None
See application file for complete search history.

(56) References Cited

U.S. PATENT DOCUMENTS 5,162,869 A * 11/1992 Michel et al. ............... 356/477
5,488,680 A   1/1996 Dragone
5,862,279 A * 1/1999 Amersfoort et al. ............ 385/40
6,289,147 B1 * 9/2001 Bulthuis et al. ................ 385/24
6,421,478 B1 * 7/2002 Paiam ........................ 385/24
6,587,615 B1 * 7/2003 Paiam ........................ 385/24

* cited by examiner

Primary Examiner—Sung H Pak

(57) ABSTRACT

A low-loss rectangular-passband multiplexer including a three-arm interferometer coherently connected to a waveguide grating router (WGR), resulting in a passband substantially of type N=3, without intrinsic loss. The three-arm interferometer has a free-spectral range (FSR) substantially equal to the channel spacing and is connected to an M-arm interferometer having a much larger FSR. The three-arm interferometer includes three waveguides each exhibiting a linearly increasing path length optically connected to a 1×3 coupler and a 3×3 coupler. The 1×3 coupler may be constructed from a series of Y-branch couplers.

7 Claims, 6 Drawing Sheets

RECTANGULAR-PASSBAND MULTIPLEXER

FIELD OF THE INVENTION

This invention relates generally to the field optical communications and in particular to a lossless rectangular-passband multiplexer having improved characteristics.

BACKGROUND OF THE INVENTION

In communications networks employing wavelength-division multiplexing (WDM), it is advantageous for de/multiplexer(s) (hereinafter we use the general term "multiplexer") to exhibit rectangular passbands and zero chromatic dispersion as such characteristics enhance the "cascadability" of the multiplexer. One device which has shown its value as a multiplexer, is the well-known waveguide grating router (WGR). (See, for example, M. K. Smit, "New Focusing and Dispersive Planar Component Based On An Optical Phased Array," Electron. Lett., Vol 24, pp. 385-386 (1988); H. Takahashi, et al, "Arrayed-Waveguide Grating For Wavelength Division Multi/Deplexer With Nanometer Resolution," Electron. Lett. Vol. 26, pp. 87-88, (1990); and C. Dragone, "An N×N Optical Multiplexer Using A Planar Arrangement Of Two Star Couplers," IEEE Photon. Technol. Lett. Vol. 3, pp. 812-815, (1991)).

As known in the art, there are a number of ways to achieve rectangular passbands with WGRs. A first way involves the use of image mismatching, such as using a y-branch, multi-mode interference (MMI) coupler or short horn on the input waveguide or modifying the grating arm lengths and losses. (See, e.g., C. Dragone, "Frequency Routing Device Having A Wide And Substantially Flat Passband," U.S. Pat. No. 5,412, 744, (1995); M. R. Amersfoort, et al., "Passband Broadenting Of Integrated Arrayed Waveguide Filters Using Multimode Interference Couplers," Electron. Lett, Vol 32, pp. 449-451, (1996); K. Okamato and A. Sugita, "Flat Spectral Response Arrayed-Waveguide Grating Multiplexer With Parabolic Waveguide Horns," Electron Lett., Vol. 32, pp. 1661-1662, (1996); C. Dragone, "Efficient Techniques For Widening The Passband Of A Wavelength Router," J. Lightwave. Technol. I, Vol. 16, pp. 1895-1906, (October 1998); and A. Rigny, et al., "Multigrating Method For Flattened Spectral Response Wavelength Multi/Demultiplexer," Electron. Lett., Vol. 33, pp. 1701-1702, (1997)). Unfortunately however, image mismatching exhibits an intrinsic loss and the sharper the passband corners, the higher the loss. As can be appreciated, a rectangular passband may be viewed as N side-by-side first-order Gaussian passbands. Consequently, the transmissivity of a rectangular passband created by image mismatching must be <=1/N.

A second way to achieve rectangular passbands with WGRs is to employ synchronized gratings which have two coherently connected interferometers having the same spatial dispersion but very different free-spectral ranges. (See, e.g., C. Dragone, "Frequency Routing Device Having a Wide And Substantially Flat Passband," U.S. Pat. No. 5,488,680, (1996); G. H. B. Thompson, et al., "An Original Low-Loss And Pass-Band Flattened $SiO_2$ on Si Planar Wavelength Demultiplexer," Optical Fiber Conference Digest, pp. 77, (1998); and C. R. Doerr, et al., "Compact And Low-Loss Integrated box-Like Passband Multiplexer," IEEE Photon. Technol. Lett., Vol. 15, pp. 918-920, (July 2003)).

More recently, it has been shown that a multiplexer may be constructed from a two-arm interferometer coherently connected to a WGR, resulting in a passband of type N=2, with little or no intrinsic loss.

SUMMARY OF THE INVENTION

I have developed a low-loss rectangular-passband multiplexer including a three-arm interferometer coherently connected to a Waveguide Grating Router (WGR), resulting in a passband substantially of type N=3, without intrinsic loss.

This innovative construction results in a demultiplexer that is particularly compact and easily constructed.

BRIEF DESCRIPTION OF THE DRAWING

A more complete understanding of the present invention may be realized by reference to the accompanying drawings in which:

FIG. 5(a) is a graph showing the measured transmissivity and FIG. 4(b) is a graph showing the group delay for both the packaged multiplexer constructed according to the present invention (solid line) and for a simulation of an improved design (dashed line)

DETAILED DESCRIPTION

Figure 1:
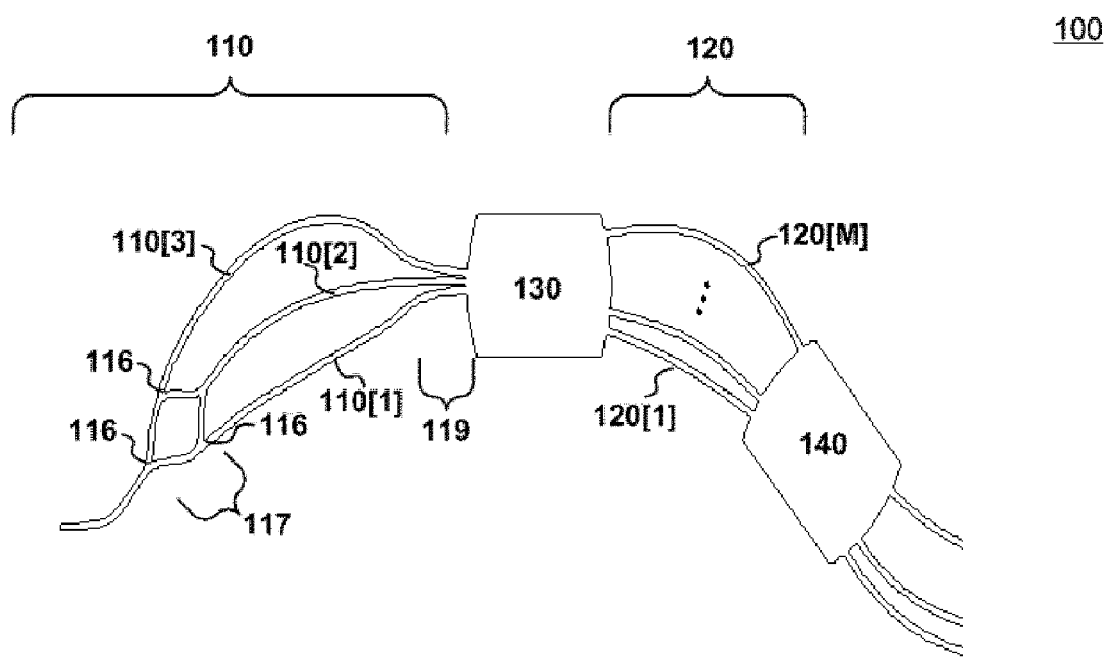
FIG. 1 is a schematic of a low-loss, rectangular-passband multiplexer according to the present invention.

With initial reference to FIG. 1, there is shown a schematic of my inventive low-loss rectangular multiplexer 100. More specifically, the multiplexer includes a three-arm interferometer 110, having a free-spectral range (FSR) substantially equal to the channel spacing, connected to an M-arm interferometer 120 with a much larger FSR. In a preferred embodiment, the M-arm interferometer 120 has M waveguides 120[1]. . . 120[M], each with a linearly increasing path length, connected to two star couplers 130, 140.

Those skilled in the art will quickly recognize the well-known M-arm interferometer 120 as a "frequency routing device" which operates as a multiplexer and demultiplexer of optical frequencies. Such frequency routing devices, are well known in the art and are described in more detail in U.S. Pat. No. 5,488,680 which issued to Dragone on Jan. 30, 1996, the entire contents of which are hereby incorporated by reference.

As is known, the star coupler(s) 130, 140 each include a plurality of input ports connected to a plurality of output ports via a free space region. The plurality (M) of output ports (for coupler 130) are connected to the M waveguides, which provide a pre-determined amount of path length difference to a corresponding plurality (M) of input ports of star coupler 140. Preferably, these devices are formed from waveguides.

The three-arm interferometer 110 comprises three waveguides 110[1], 110[2], 110[3], each exhibiting a linearly increasing path length. The three waveguides 110[1], 110[2], 110[3] are connected to two couplers 117, 119, one at each end of the waveguides.

Preferably, for the purposes of my invention, these two couplers 117, 119 are not star couplers such as those (130, 140) connected to the M-arm interferometer 120. This is due in part, to the fact that star couplers exhibit a high excess loss when the number of ports is small and when the entire Brillouin zone must be used by the particular application.

For example, a 3×3 star coupler typically exhibits ~1.8 dB excess loss as one goes from an outer-input port to an outer-output port. Additionally, if the second coupler coupled to the three-arm interferometer 110 was a star coupler, it would emit unwanted light to its higher diffraction orders into the WGR, causing crosstalk. As a result, a preferred embodiment of my inventive structure employs a pattern of Y-branch couplers 116 comprising the first coupler 117 and a 3×3 directional coupler [or equivalently a 3×3 multimode interference (MMI) coupler] comprising the second coupler 119.

Figure 2:
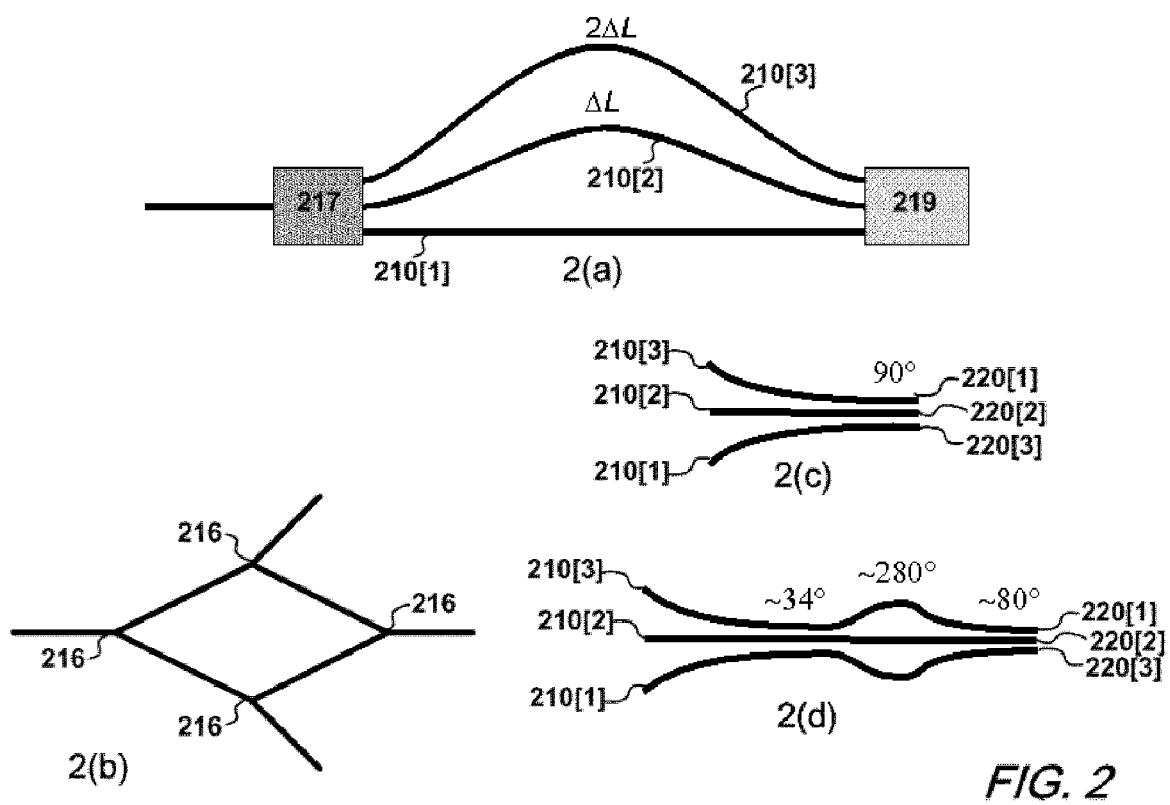
FIG. 2 is a schematic of a three-arm interferometer and associated couplers as preferably used in the multiplexer of FIG. 1.

Turning now to FIG. 2(a), there is shown a schematic of the three arm interferometer 210 and couplers 217, 219, previously described. In particular the three arms 210[1], 210[2], and 210[3], which comprise the three-arm interferometer 210, exhibit a linearly increasing length. That is to say, arm 210[2] is longer than arm 210[1] by an amount ΔL and arm 210[3] is longer than arm 210[2] by an amount 2ΔL.

At opposite ends of the interferometer 210, are couplers 217 and 219 which are shown individually in greater detail in FIG. 2(b) and FIG. 2(c)/(d), respectively. With initial reference to FIG. 2(b), there is shown coupler 217 comprising a pattern of Y-branch couplers 216. And while this is the preferred embodiment for coupler 217, it is noted that any low-loss 1×3 coupler will work.

Viewed from another aspect, coupler 217 may be thought of as a series of 1×2 splitters—in this example—4 (four), 1×2 splitters. Additionally, if the 1×2 splitters comprising coupler 217 are selectively segmented, a desirable split ratio in addition to very low loss may be realized. As can be greatly appreciated, a significant advantage of this 1×3 coupler design is that the splitting ratio is robust to wavelength, polarization, and fabrication changes.

More specifically, if the 1×2 splitters comprising coupler 217 are each 50/50 splitters, then the net splitting ratio directed into the three arms (210[1], 210[2], and 210[3]) would be 25/50/25. Such a splitting ratio would be quite desirable for the rectangular passband described herein. If, on the other hand, two—1×2 splitters having a 66.7/33.3 splitting ratio were used in the two outer-most splitters, and two, 1×2 splitters having a 50/50 splitting ratio were used in the other two, the resulting net split would be 33.3/33.3/33.3, distributed evenly into the three arms 210[1], 210[2], and 210[3].

Turning our attention now to the other end of this three arm interferometer 210, and in particular coupler 219, we again note that this coupler 219 has been shown as a simple, 3×3 directional coupler. As can be appreciated by those skilled in the art, if such a simple, 3×3 directional coupler is used such as that shown in FIG. 2(c), there would be a relatively small output from the center port 220[2], thereby negatively impacting the total device loss and passband shape.

However, by using a 2-stage 3×3 directional coupler such as that shown in FIG. 2(d), we may effectively emulate a 3×3 star coupler. More particularly, and with reference to that FIG. 2(d), one can observe that interferometer arm(s) 210[1] and 210[3] exhibit a series of consecutive "bends", resulting in a series of phase shifts between local eigenmodes. In particular, a first phase shift of ~35 degrees, followed by one of substantially ~270 (i.e., −90) degrees, followed by another of substantially ~90 degrees, wherein such phases may be modulo 360 degrees. In this manner, the output of the 2-stage 3×3 coupler so constructed would be substantially equal in transmissivity across the three outputs 220[1], 220[2], and 220[3]. Note that each directional coupler could be replaced by an equivalent MMI coupler without departing from the spirit of the invention.

Figure 6:
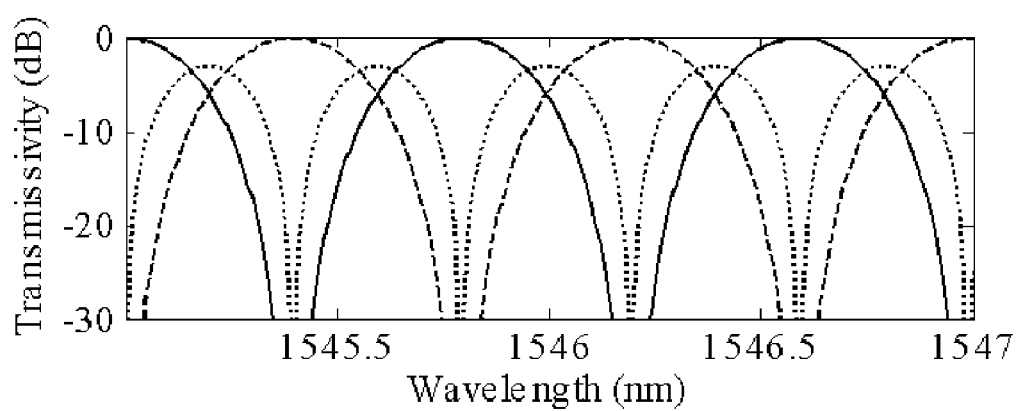
FIG. 6 is a graph showing the calculated demultiplexing spectra emitted by the interferometer of FIG. 2(a) when the 3×3 coupler is single section FIG. 6(a) and two-section FIG. 6(b).
Figure 6:
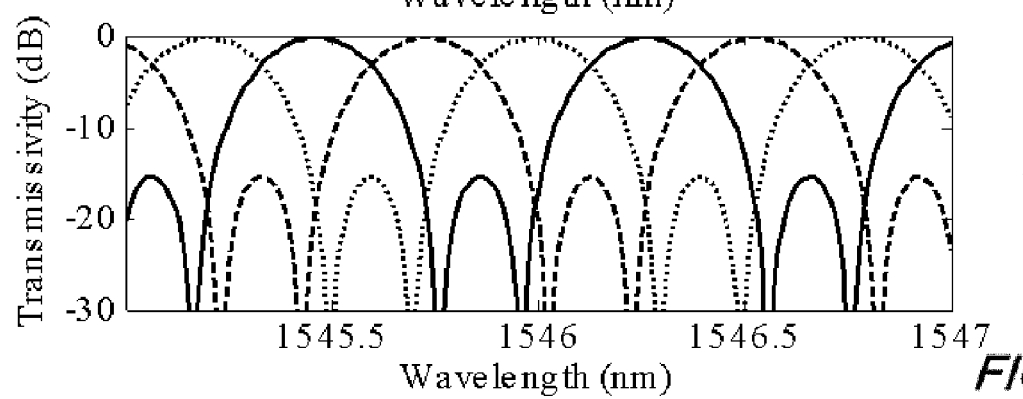

Another way to understand the operation of the single- and two-stage 3×3 couplers is with reference to FIG. 6. FIG. 6 shows the calculated demultiplexing spectra from port 220[1] (solid line), 220[2] (dotted line), and 220[3] (dashed line) of the interferometer shown in FIG. 2(a) when the 3×3 coupler is single-section [FIG. 6(a)] and two-section [FIG. 6(b)]. Because the relative phases between the outputs 220[1] . . . 220[3] in the single-section coupler case are +/−90 degrees, all three passbands in FIG. 6(a) are not equally distributed in the free-spectral range. This results in a narrower passband when used in the device of FIG. 1. The two-stage coupler is designed to have +/−120 degrees relative phase between the outputs 220. Thus all three passbands in FIG. 6(b) are equally distributed in the free-spectral range, as they would be if the 3×3 coupler was replaced by a true star coupler. This widens the passband in the device of FIG. 1.

At this point, it is useful to analyze the operation of the 3×3 directional coupler. As is known, the input/output matrix of a simple 3×3 directional coupler is:

$$\frac{1}{4}\begin{pmatrix} 1 & \sqrt{2} & 1 \\ \sqrt{2} & 0 & -\sqrt{2} \\ 0 & -\sqrt{2} & 1 \end{pmatrix} \tag{1}$$

$$\begin{pmatrix} \exp(j2\theta) & 0 & 0 \\ 0 & \exp(j\theta) & 0 \\ 0 & 0 & 1 \end{pmatrix} \begin{pmatrix} 1 & \sqrt{2} & 1 \\ \sqrt{2} & 0 & -\sqrt{2} \\ 1 & -\sqrt{2} & 1 \end{pmatrix}$$

where Θ is proportional to the length of the coupler. In order to have zero chromatic dispersion in the passband, Θ=π/2. This insures that an input into one of the outer ports of the coupler creates a symmetrical output on the other side of the coupler, thereby causing all wavelengths in the passband to have the same average path length through the device.

The power distribution at the output of a 3×3 coupler with Θ=π/2 when launching into an outer waveguide is ¼, ½, ¼, respectively. The pattern of the four Y-branch couplers used at the input of the three-arm interferometer described previously produces the same power distribution, and—at the same time—is insensitive to wavelength, polarization, and fabrication (WPF) changes. This power distribution works well also in the two-section 3×3 coupler case.

Advantageously such mode matching insures ~100% transmissivity for the passband edges. If, on the other hand, we made the 1×3 coupler using three coupled waveguides (directional or MMI coupler) instead of the more-desirable Y-branch couplers, deviation from the desired power distribution in the interferometer arms due to small WPF changes in the coupler would have resulted in a high passband ripple.

As can be appreciated—and in sharp contrast to star couplers—directional (and MMI) couplers are "bounded", consequently the phase difference between the outputs of such couplers is not necessarily monotonic. One can show however, that for a P×P directional (or MMI) coupler, the phase changes monotonically from output to output when launching into a single input only when P<4. Consequently the maximum number of arms we can have in the interferometer connected to the WGR—if we want its path-length difference to monotonically increase—is three (3).

One can quickly appreciate the effect of this number-of-arms limitation if, for example, we tried to expand the present design to include a 4-arm interferometer using a 4×4 directional coupler. To construct such a device, the distribution of the arm lengths in the 4-arm interferometer would have to be in the ratio 0:2:1:3, which—as can be readily appreciated by those skilled in the art—cannot be realized compactly.

Yet another consequence of bounded coupler(s) is that a demultiplexed image—emerging from the interferometer 117 of FIG. 1, say—spatially bounces back and forth with wavelength, instead of in a saw-tooth pattern as would be the case if a star coupler were used. This results in a passband that does not have as high a figure of merit (1-dB passband width divided by 20-dB passband width) as an N=P passband. Notwithstanding these limitations of bounded couplers, the multi-stage 3×3 directional coupler that is employed here can achieve the desired sawtooth pattern.

A 16-ch version of the multiplexer was designed and subsequently constructed. It was fabricated using silica-on-silicon waveguides with 0.80% core-cladding index contrast and a core height of 6.0 µm. The device exhibited the following characteristics: a channel spacing of 100 GHz; 82 arms comprising the waveguide grating router (WGR); an operating grating order in the WGR of 83; a bend radius of 4.1 mm; output waveguide port widths of 11.5 µm, and grating-arm capture angle(s) of 0.13 rad in both star couplers.

The 3×3 directional coupler (this design used the single-section design) employed included three waveguides, the outer two bending in with a radius of 10 mm to a center-to-center spacing of 8.2 µm. Additionally, the waveguides are initially 4.3 µm wide and widen to 4.8 µm once all three are parallel. A straight part of the waveguides is 820 µm long.

A chip was subsequently diced out from a fabricated wafer, a fiber ribbon assembly was secured to the left-hand facet of the chip, and the assembly subsequently placed in a protective package.

In operation, the polarization-dependent wavelength shift exhibited is 26 µm. In order to wavelength-align the 3-arm interferometer to the WGR, it was necessary to drive the thermooptic phase shifters in the arms such that the longest arm was driven by 490 mW and the middle arm driven by 470 mW.

Figure 3:
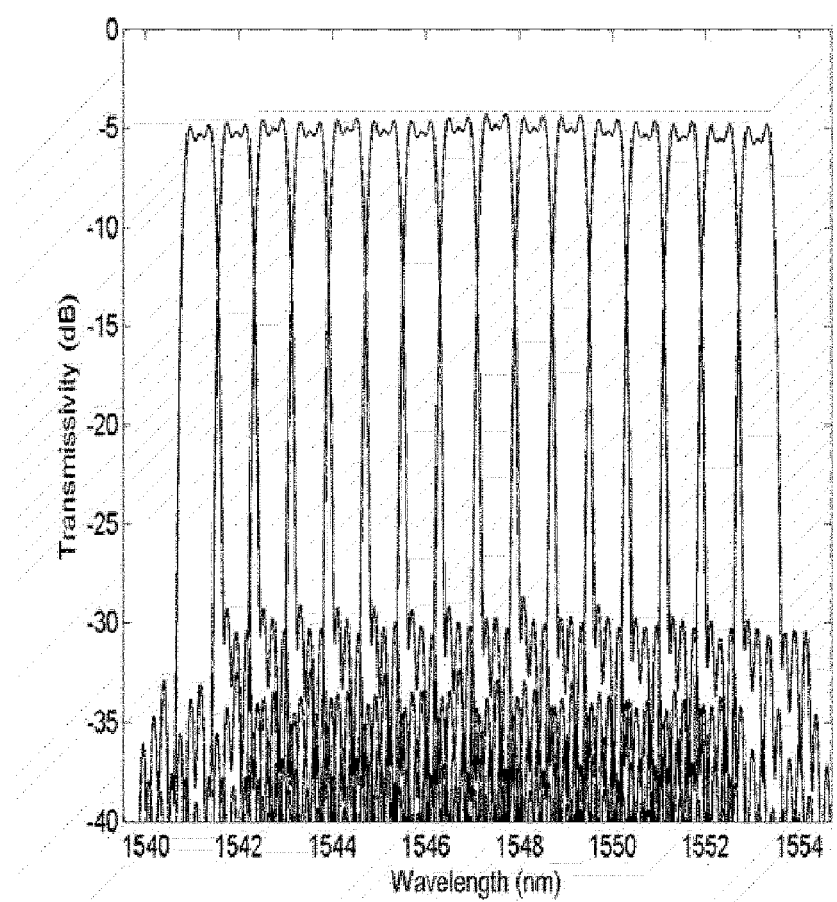
FIG. 3 is a graph showing the measured transmissivities from 16 outputs of a packaged multiplexer constructed according to the present invention.
Figure 4:
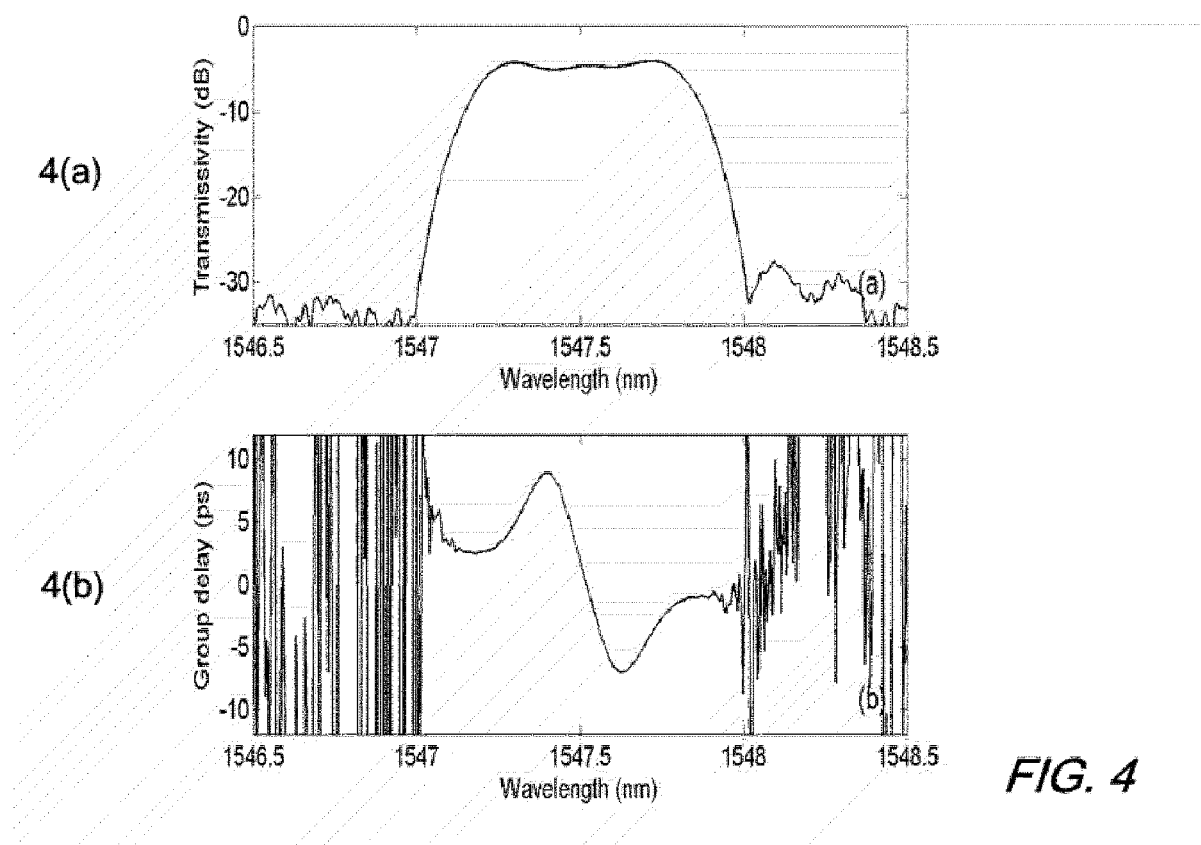
FIG. 4(a) is a graph showing the measured transmissivity and FIG. 4(b) is a graph showing the group delay for channel 9 of the packaged multiplexer constructed according to the present invention.

FIG. 3 is a graph showing the measured transmissivities for the 16 channels (same phase-shifter settings for all channels). The worst-case insertion loss, including one connector, is 5.8 dB, and the worst-case peak-to-peak ripple in the passband is 1.0 dB. The worst-case crosstalk (±30 GHz from channel centers) is 23.4 dB. The passband figure of merit is 0.56 nm/0.96 nm=0.58. FIG. 4 is a graph showing the measured transmissivity and group delay for channel 9. The loss is fiber-to-fiber, including one connector and single, arbitrary polarization.

To help understand these performance characteristics, we simulated the device using eigenmode analysis and the sinc beam propagation method. Using the design parameters of the demonstrated device and making the coupling in the 3×3 coupler significantly weaker than expected (~50% of optimum), the solid curve of FIG. 5 was obtained. As can be readily appreciated, the close match between simulation and experiment means that the coupling in the 3×3 directional coupler is likely too weak with these preliminary devices. This is probably due to pattern-dependent etching causing the central waveguide to be narrower than the outer ones, resulting in propagation constant mismatch among the three waveguides.

Figure 5:
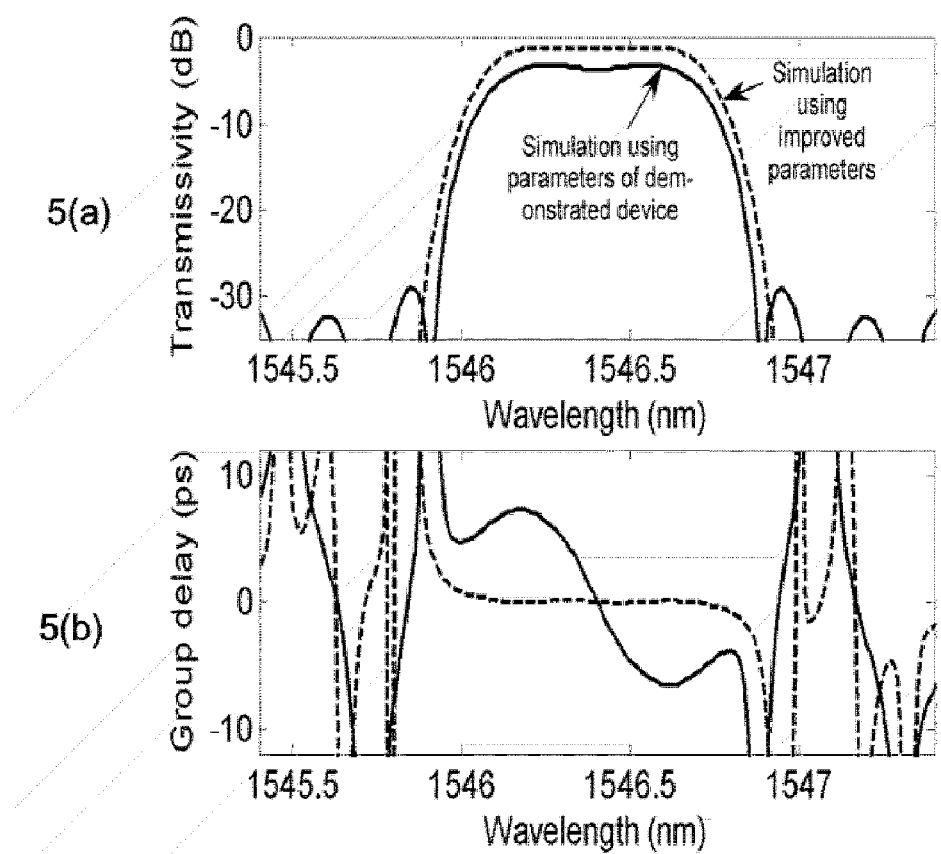

When we reran the simulation with the correct coupler strength, and we tweaked the design by changing the grating arm number to 88, the grating inlet fill angle to 0.155 rad in both star couplers, and the output waveguide widths to 14.5 µm, the dashed curve of FIG. 5 was obtained. As one can see, the loss decreased by ~2 dB, the ripple and chromatic dispersion disappeared, and the crosstalk improved by >7 dB. This improved passband has a figure of merit of 0.59. This can be favorably compared to alternative multiplexers consisting of a two-arm interferometer synchronized to a WGR, which had a figure of merit of 0.45. If we change the 3×3 coupler to the two-section design of FIG. 2($d$), the passband figure of merit increases even more.

As can be appreciated, the increased figure of merit which is characteristic of devices constructed according to the present invention should prove to be extremely useful for high spectral efficiency systems and highly cascaded devices such as wavelength add-drops.

At this point, while we have discussed and described our invention using some specific examples, those skilled in the art will recognize that our teachings are not so limited. Accordingly, our invention should be only limited by the scope of the claims attached hereto.

What is claimed is:

1. An optical apparatus comprising:
   a 1×3 optical coupler;
   a 3-arm interferometer, optically connected to the 1×3 coupler, wherein the 3-arms exhibit a linearly increasing path length; and
   a 3×3 coupler, optically connected to the interferometer, CHARACTERIZED IN THAT:
   said 3×3 coupler is one selected from the group consisting of: directional coupler, or multimode interference coupler having more than one stage and a non-coupled region between coupled regions.

2. The optical apparatus of claim 1 wherein said 1×3 optical coupler comprises an arrangement of Y-branch couplers and at least one of the Y-branch couplers exhibits a coupling ratio other than 50/50.

3. The optical apparatus of claim 1 wherein said 3×3 coupler exhibits a substantially 90 degree phase shift between local eigenmodes.

4. The optical apparatus of claim 1 wherein said 3×3 coupler is a two-stage coupler, and exhibits phase shifts of substantially, ~35 degrees, ~270 degrees, and ~90 degrees, or a modulo 360 degrees thereof.

5. The optical apparatus of claim 1, further comprising:
   an M-arm interferometer, optically connected to the 3×3 coupler, wherein the arm interferometer exhibits a free spectral range substantially equal to a channel spacing and the M-arm interferometer exhibits a free spectral range that is substantially greater (>>) than the free spectral range of the 3-arm interferometer.

6. The optical apparatus of claim 5 wherein the M-arm(s) of the M-arm interferometer exhibits a linearly increasing path length.

7. The optical apparatus of claim 1 wherein the first arm of the 3-arm interferometer exhibits a path length L, the second arm of the 3-arm interferometer exhibits a path length greater than the first arm by an amount substantially equal to $\Delta L$ and the third arm of the 3-arm interferometer exhibits a path length greater than the second arm by an amount substantially equal to $2\Delta L$.

\* \* \* \* \*